(12) United States Patent
Chen

(10) Patent No.: US 7,179,506 B2
(45) Date of Patent: Feb. 20, 2007

(54) SURFACE MODIFICATION OF SOLID PHASE OBJECTS BY POLY(VINYL ALCOHOL)

(75) Inventor: Wei Chen, South Hadley, MA (US)

(73) Assignee: Mount Holyoke College, South Hadley, MA (US)

( * ) Notice: Subject to any disclaimer, the term of this patent is extended or adjusted under 35 U.S.C. 154(b) by 0 days.

(21) Appl. No.: 10/162,445

(22) Filed: Jun. 3, 2002

(65) Prior Publication Data

US 2003/0091750 A1    May 15, 2003

(51) Int. Cl.
*B05D 1/18* (2006.01)

(52) U.S. Cl. .................. 427/430.1; 427/443.2

(58) Field of Classification Search ............. 427/430.1, 427/443.2
See application file for complete search history.

(56) References Cited

U.S. PATENT DOCUMENTS

| | | | | |
|---|---|---|---|---|
| 3,369,003 | A * | 2/1968 | Verdol .................. | 526/297 |
| 5,508,113 | A * | 4/1996 | Knoerzer ................ | 428/500 |
| 5,721,309 | A | 2/1998 | Sharma et al. ........... | 524/506 |
| 5,756,199 | A | 5/1998 | Kerbow et al. ........... | 428/327 |
| 5,773,587 | A * | 6/1998 | Lowe et al. ............. | 530/413 |
| 6,495,266 | B1 | 12/2002 | Migliorini ............... | 428/461 |
| 6,689,036 | B2 | 2/2004 | Balzar et al. ............ | 493/330 |
| 6,709,718 | B2 | 3/2004 | O'Brien ................. | 427/538 |
| 6,824,872 | B2 | 11/2004 | Coates et al. ............ | 428/403 |
| 6,828,013 | B2 | 12/2004 | Ambroise et al. ......... | 428/308.4 |

OTHER PUBLICATIONS

Shaffer et al., Fabrication and Characterization of Carbon Nanotube/Poly(vinyl alcohol) Composites. Advanced Materials.*
Coupe et al. A New Approach to Surface Fictionalization of Fluoropolymers Macromolecules 34, 2001.*
Serizawa et al. Stepwise Assembly of Ultrathin Poly(vinyl alcohol) Films on a Gold Substrate by Repetitive Adsorption/Drying Processes. Langmuir 15. 1999.*
Kim et al. Effects of the Degree of Crosslinking on Properties of Poly(vinyl alcohol) Membranes. Polymer Journal. vol. 25 No. 12. 1993.*

(Continued)

*Primary Examiner*—Timothy Meeks
*Assistant Examiner*—David Turocy
(74) *Attorney, Agent, or Firm*—Bowditch & Dewey, LLP

(57) ABSTRACT

The adsorption of poly(vinyl alcohol) (PVOH) from aqueous solution to hydrophobic solid-phase objects with varying chemical compositions, sizes, and geometries, is assessed as a new approach for surface modification. The effects of PVOH concentration, adsorption kinetics, PVOH molecular weight, adsorption temperature, solution ionic strength and stepwise deposition on wettability and adsorbed amounts were analyzed by water contact angle and X-ray Photoelectron Spectroscopy. PVOH adsorbs to solids significantly different than do other molecules. A much larger adsorbed amount and more dramatic improvement of wettability occurs compared to other molecules. The low solubility of PVOH, the strong tendency for it to crystallize at the solid/water interface and stabilization of the PVOH film by inter- and intra-molecular hydrogen bonding give additional driving forces for adsorption. The available —OH group from adsorbed PVOH is a versatile functional group and is further chemically transformed to a range of other functional groups to impart desired surface properties.

1 Claim, 3 Drawing Sheets

R = functional groups, *e.g.*, alkyl, perfluoroalkyl...

OTHER PUBLICATIONS

Coupe, B.; Chen, W. *Macromolecules* 34, 1533 (2001).
Serizawa, T.; Hashiguchi, S.; Akashi, M. *Langmuir* 15, 5363 (1999).
Kim, K. J.; Lee, S. B.; Han, N. W. *Polym. J.* 25, 1295 (1993).
Varbo, T. G.; Gardella, Jr., J. A.; Calvert, J. M.; Chen, M. S. *Science* 262, 1711 (1993).
Shoichet, M. S.; McCarthy, T. J. *Macromolecules* 24, 1441 (1991).

* cited by examiner

R = functional groups, *e.g.*, alkyl, perfluoroalkyl...

SURFACE MODIFICATION OF SOLID PHASE OBJECTS BY POLY(VINYL ALCOHOL)

FIELD OF THE INVENTION

The present invention relates to the surface modification by poly(vinyl alcohol) of hydrophobic solid-phase, polymeric objects, particularly those composed of fluoropolymers, and non-metal inorganic objects, particularly silicon wafers.

BACKGROUND OF THE INVENTION

There have been numerous surface chemistry studies directed at increasing the surface energy of fluoropolymers to improve wettability and promote adhesion. Unlike most polymers, perfluoroalkanes are chemically inert. Accordingly, there are no direct chemical methods for the conversion of CF, $CF_2$, and $CF_3$ groups in perfluoroalkanes to any functionality. The most successful chemical reactions of fluoropolymers involve single electron reduction. However, this process most often changes the color of the treated film and the treated film does not have a significant shelf life. Plasma chemistry and surface grating have also been used to modify fluoropolymer surfaces. However, plasma chemical treatment is very expensive and results in a product with poor shelf life and migration of the functional groups to the bulk. Similarly, surface grafting is also very expensive because it requires high energy input to achieve the modification. Additionally, these methods are limited in their applicability to the treatment of films and not objects with more significant three-dimensional geometries. They also are not useful in treating porous objects or the interior of hollow objects. Another significant drawback to plasma chemical treatment is that it does not introduce discrete functional groups, but rather a mixture of species. Likewise, surface grafting usually results in inhomogeneous modification.

There are numerous reports from other research fields, however, of biopolymers spontaneously adsorbing to fluoropolymers. There is one report of a homopolymer (poly(L-lysine)) adsorbing to a fluoropolymer from aqueous solution. In this instance, it is the red action of interfacial free energy (the displacement of high energy water molecules from the fluoropolymer/water interface) that drives polymer or biopolymer adsorption ("hydrophobic interactions"). Poly(allylamine hydrochloride), polyethylenimine, and poly(acrylic acid) hash been adsorbed to poly(tetrafluoroethylene-co-hexafluoropropylene) (FEP) surfaces from aqueous solutions under varying conditions. Unfortunately, the extent of surface functionalization is minimal using these polymers.

What is needed is an easily used, economical, and effective surface treatment to modify hydrophobic solid-phase polymeric object, particularly those composed of fluoropolymers, and non-metal inorganic objects of any size and geometric conformation. The ideal method should improve surface wettability and promote adhesion, while maintaining desired performance characteristics of the modified object. The ideal treatment would result in a stable, durable product with a substantial shelf life and relatively uniform dispersal of discrete functional groups that do not migrate to the bulk.

SUMMARY OF THE INVENTION

Accordingly, it is an object of the present invention to provide hydrophobic solid-phase polymeric objects, particularly those composed of fluoropolymers, and non-metal inorganic objects, the objects having a modified surface with improved wettability, adhesion, andt performance characteristics.

It is another object of the present invention to provide a method of modifying the surface of solid-phase polymeric objects, particularly those composed of fluoropolymers, and non-metal inorganic objects, the objects having lower surface energy than poly(vinyl alcohol).

It is an additional object of the present invention to provide a method of modifying the surface of such objects having any geometry and size.

It is another object of the present invention to provide a method of modifying the surface of such objects that is easily used, economical, and effective.

It is a further object of the present invention to provide a method of modifying the surface of such objects that results in a stable, durable product with significant shelf life without migration of functional groups to the bulk.

It is yet another object of the present invention to provide a method of modifying the sur ace of such objects that provides a relatively uniform dispersal of discrete functional groups and not a mixture of species.

It is a still further object of the present invention to provide a method of modifying the surface of such objects that results in a product that may further be modified by subsequent functionalization.

The present invention relates to the unique adsorption behavior of poly(vinyl alcohol) (PVOH) from aqueous solution to solid surfaces with lower surface energies, particularly to polymeric surfaces, and most particularly to fluoropolymeric surfaces, such as pol (tetrafluoroethylene-co-hexafluoropropylene) (FEP). Adsorption of poly(vinyl alcohol) (PVOH) at solid/liquid interfaces is much greater than that of other molecules. Surface modification involving adsorption of PVOH is applicable to all hydrophobic (relative to PVOH) solids with different chemical compositions, sizes, and geometries.

The adsorption of PVOH to the solid/water interface is demonstrated as a new approach to the surface modification of solids. Surface modification of the objects is accomplished using the adsorption of functional PVOH to the solid/water interface as a method to incorporate discrete polar functionality to the object surface and by means of further functionalization of the available PVOH hydroxyl groups.

As compared with other known polymers adsorbed to solid surfaces from aqueous solutions, the extent of surface functionalization is improved using PVOH due to its different adsorption behavior. Adsorption of poly(vinyl alcohol) (PVOH) at solid/liquid interfaces is mug,h greater than that of other molecules. The low solubility of PVOH and, likely more importantly, its strong tendency to crystallize at the solid/water interface and the stabilization of the film by inter- and intra-molecular hydrogen bonding provide additional driving forces for adsorption. Failure tests indicated cohesive failure occurred within the substrate and not at the substrate/PVOH interface. Thus, the force of adhesion of the PVOH to the substrate is at least as strong as the strength of the substrate itself.

The adsorbed PVOH on solids has excellent long term stability (i.e., no migration to the bulk). The adsorption of PVOH itself to the substrate results in a dramatic improvement in surface wettability. Further functionalization of the hydroxyl groups on adsorbed PVOH surfaces impart additional desirable surface properties such as wettability, adhesion, friction, and biocompatibility.

A significant proportion of hydroxyl groups in the PVOH remain available for further modification even after crosslinking, which involves a reaction of only a portion of the PVOH hydroxyl groups. This is demonstrated by the retention of surface wettability after PVOH crosslinking. Crosslinking of the adsorbed PVOH also enhances its solvent resistance. Additionally, because PVOH is water soluble, the process is both economical and environmentally friendly in that it does not require the use of volatile organic solvents or the input of high energy into the system.

Because the process involves dipping a solid object in a PVOH aqueous bath, this method can be applied to the surface modification of a solid object of any size and geometry. Additionally, it is suitable for use on a variety of surfaces, including non-metallic inorganic surfaces, such as silicon wafers, and organic surfaces, including various polymers, but most especially fluoropolymers, and carbon compositions, such as nanotubes and graphite.

The present invention has many potential uses. For example, because of their low dielectric constants, fluoropolymer materials are used as cable and wire sheathing insulators. Modification with PVOH provides better composite adhesion and, therefore, improved durability of the cable and wire. The improved wettability provided by the PVOH surface modification is desired in a number of uses, including the filtration of industrial and environmental waste and in surgical devices, such as vascular grafts, where increased meltability correlates to increased biocompatibility. Additional uses are in improving existing coating technology, e.g., in enhancing flavor absorption on fluoropolymer "glide" dental floss.

Other objects, features, and advantages will be apparent from the following detailed description of preferred embodiments thereof taken in conjunction with the accompanying drawings in which:

DETAILED DESCRIPTION OF THE INVENTION

Figure 1:
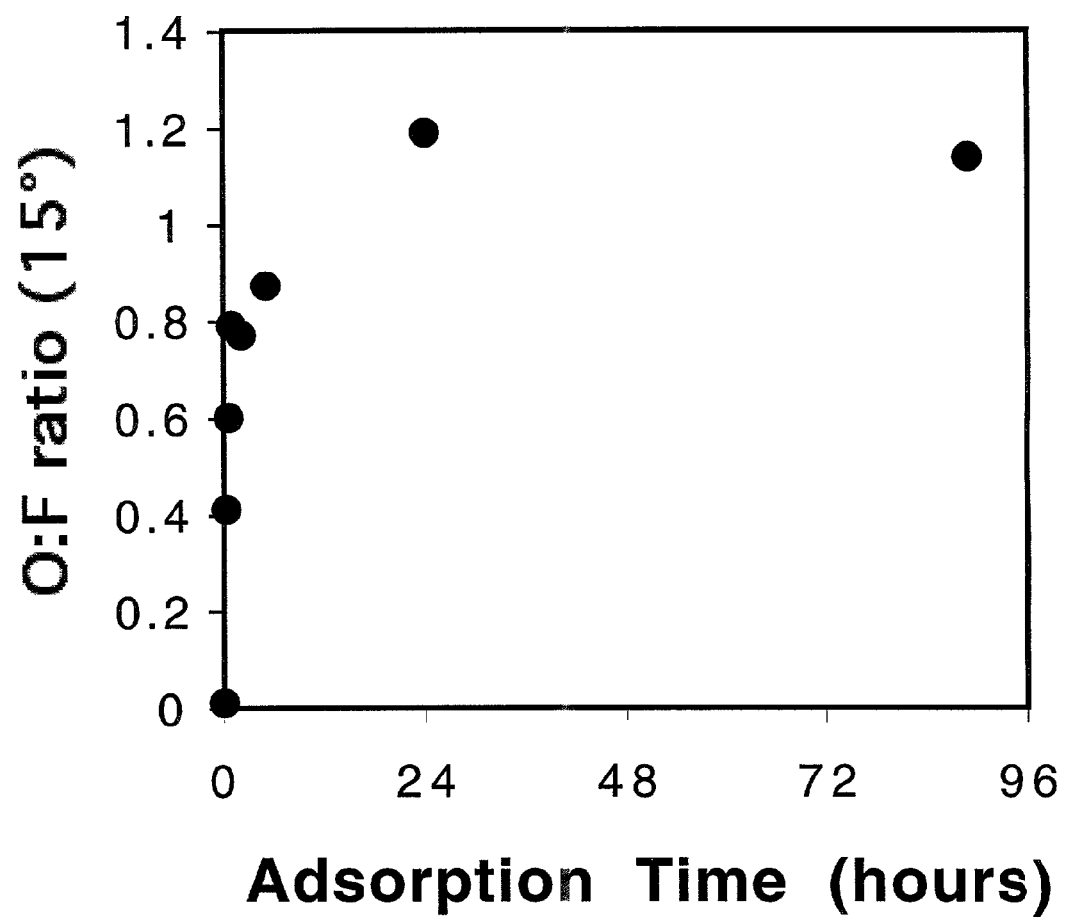
FIG. 1 shows O/F ratios calculated from XPS atomic composition data at 15° takeoff angle as a function of adsorption time.

The adsorption of PVOH to a variety of polymeric substrates and to silicon in terms of chemical composition and surface energies was examined. After adsorptions/reactions, all film samples were rinsed with purified water and dried at reduced pressure, unless otherwise specified before characterization.

All samples studied have been analyzed by water contact angle and X-ray Photoelectron Spectroscopy (XPS). Dynamic contact angles, advancing ($\theta_A$) and receding ($\theta_R$), were recorded while the probe fluid was added to and withdrawn from the drop, respectively. Each reported angle represented an average of at least six measurements. Contact angle assesses the composition of the outer few Å. X-ray photoelectron spectra (XPS) Spectra were recorded at two different takeoff angles, 15° and 75°, between the plane of she sample surface and the entrance lens of the detector optics, which give the composition of the outermost ~10 Å and ~40Å, respectively.

Fluoropolymer-PVOH

One of the most commercially useful fluoropolymers is poly(tetrafluoroethylene-co-hexafluoropropylene) (FEP). Accordingly, a series of adsorption experiments of PVOH to FEP from aqueous solution have been carried out. The effects of PVOH concentration, ionic strength, stepwise deposition, adsorption kinetics, and system temperature on the adsorbed amount, crosslinking the adsorbed PVOH, and wettability have been examined.

FEP films were cleaned in 25 mL of concentrated sulfuric acid solution containing 0.5 g of potassium chlorate for 2 h. The film samples were rinsed with purified water and THF, and then dried at reduced pressure.

EXAMPLE 1

In order to provide a reference, a PVOH film on a non-reactive, rigid substrate was male. PVOH ($M_w$=108,000) was dissolved in purified water in a glass vial for approximately 1 h while stirring and heating to about 100° C. The solution was left to cool to room temperature, then made to 0.5 M (based on repeat units). This solution was used to cast a PVOH film on a glass slide. Water contact angles of the cast film after drying at reduced pressure overnight were $\theta_A/\theta_R$=63 °/17°.

EXAMPLE 2

In order to determine the effects of PVOH concentration on adsorption, PVOH ($M_w$=108,000) solutions of 0.005 M, 0.01 M, 0.05 M, 0.1 M, and 0.5 M were prepared. FEP films were immersed in these solutions for 89 h at room temperature. These FEP-PVOH samples displayed indistinguishable water contact angles, $\theta_A/\theta_R$ =65°±3°/18°±3°, which in turn are indistinguishable from those of the solution-cast reference PVOH film ($\theta_A/\theta_R$=63°17°). The contact angles of virgin FEP are $\theta_A/\theta_R$=117°/93°.

This indicates that the thickness of the adsorbed PVOH reaches at least the sampling depth of contact angle, which is on the order of a few Å. O/F ratios obtained from XPS (at 15° takeoff angle) were 1.06, 1.14, 1.07, 1.01 and 4.21, respectively, for the different concentrations. This trend indicates that the adsorbed amount is independent of concentration except at the highest concentration studied and that high PVOH concentrations yield relatively thick adsorption layers.

TABLE 1

XPS Atomic Composition Data (15° Takeoff Angle) and Advancing and Receding Water Contact Angles (°) for FEP Derivatives

| Film Samples | % C | % F | % O | % N | O/F | $\theta_A/\theta_R$ |
|---|---|---|---|---|---|---|
| FEP | 34.04 | 65.32 | 0.64 | — | — | 117/93 |
| PVOH (cast film) | | | | | | 63/17 |
| FEP-PLL | 54.75 | 38.02 | 3.53 | 3.70 | 0.097$^{N/F}$ | 104/16 |
| FEP-PVOH (no salt) | 54.04 | 21.02 | 24.94 | — | 1.19 | 63/17 |
| FEP-PVOH (salt) | 66.23 | 3.38 | 30.38 | — | 8.99 | 68/18 |
| FEP-PVOH (1 layer) | 51.29 | 27.45 | 21.26 | — | 0.79 | 73/20 |

TABLE 1-continued

XPS Atomic Composition Data (15° Takeoff Angle)
and Advancing and Receding Water Contact Angles (°)
for FEP Derivatives

| Film Samples | % C | % F | % O | % N | O/F | $\theta_A/\theta_R$ |
|---|---|---|---|---|---|---|
| FEP-PVOH (2 layers) | 52.53 | 23.53 | 23.94 | — | 1.02 | 65/19 |
| FEP-PVOH (3 layers) | 57.36 | 19.39 | 23.25 | — | 1.28 | 64/19 |
| FEP-PVOH (4 layers) | 65.26 | 5.51 | 29.22 | — | 5.30 | 64/19 |

EXAMPLE 3

In order to determine the kinetics of the adsorption process, FEP films were left in 0.01 M PVOH ($M_w$=108,000) solution for 10 min 30 min, 1 h, 2 h, 5 h, 24 h, 89 h, and 100 h. FIG. 1 shows the O/F ratios obtained from XPS at 15° takeoff angle as a function of adsorption time. O/F increased and reached a plateau after 24 h adsorption time. Water contact angle data are consistent with this finding. XPS atomic composition (15° takeoff angle) and contact angle data of an FEP sample analyzed after adsorption in 0.01 M PVOH for 24 h are given in the fourth entry of Table 1.

EXAMPLE 4

To study the effect of solution ionic strength on adsorption, solutions were prepared to give final concentration of 0.01 M PVOH ($M_w$=108,000) and 2 M NaCl. An FEP film was, immersed in the solution for 24 h at room temperature.

Contact angles of FEP-PVOH (with salt) are not much different than solution-cast PVOH film, indicating that the adsorbed PVOH thickness has reached the sampling depth of contact angle. The O/F ratio of the sample obtained at 15° takeoff angle is 8.99, compared to 1.19) when no salt is added. Ions increase the surface tension of water, increasing the FEP/water interfacial free energy, and lower the solubility of PVOH. Thus, the thickness of the PVOH layer should be controllable by changing the ionic strength of the solution.

EXAMPLE 5

Figure 2:
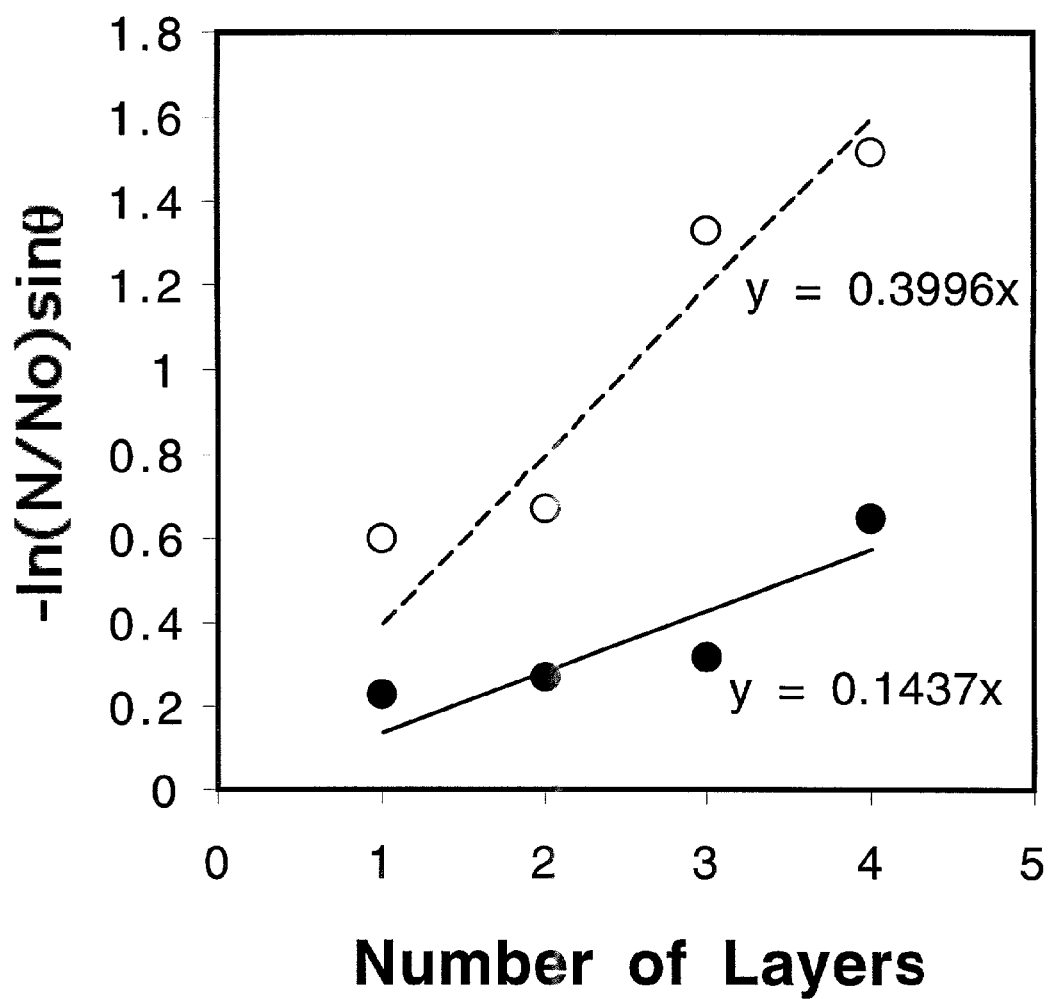
FIG. 2 shows plots of $-\ln(N/N_0)\sin\theta$ versus the number of layers in the multilayer film. The closed (●) and open (○) symbols are data recorded at 15° and 75° takeoff angles, respectively.

Stepwise assemblies of PVOH thin films on FEP that involved repetitive adsorption/drying cycles were carried out. FEP films were immersed in 0.01 M PVOH ($M_w$=108,000) solution for 1 h, rinsed with purified water and dried for 1 h at reduced pressure before the next adsorption step. Up to 4 layers of PVOH were assembled onto the FEP surface. XPS atomic composition (15°takeoff angle) and contact angle data of these multilayer assemblies (Table 1) indicate that the PVOH thickness increases as the number of layers increases. The average PVOH thickness can be calculated using equation 1, $$-\ln(N/N_0)\sin\theta = nz/\lambda \qquad (1)$$

where N is the fluorine content of FEP-(PVOH)$_n$, $N_0$ is the fluorine content for virgin FEP, n is the number of layers, z is the average layer thickness of the individual PVOH layers, $\lambda$ is the mean free path of the $F_{1s}$ electrons, and $\theta$ is the takeoff angle. The overall linearity of the dates shown in FIG. 2 indicates that the individual layer thicknesses are close to constant; the slopes of the lines correspond to $z/\lambda$; and a longer mean free path is indicated by the lower slope of the 15° takeoff angle data. Angular dependent mean free paths have been reported and indicate an anisotropic structure of the assembly which allows the "channeling" of electrons at angles close to the plane of layer buildup at lower takeoff angle. The average PVOH layer thickness is calculated, using the 75° takeoff angle data, to be about 8.2 Å. Thick layers of PVOH can be prepared on fluoropolymer surfaces using this stepwise process. The driving force for the multilayer assembly is presumably intermolecular hydrogen bonding between the adsorbed PVOH in the dry state and PVOH chains in aqueous solution.

The adsorbed PVOH thin film is sufficiently stable that it does not redissolve in aqueous solution under the testing condition (in purified water at room temperature for 14 days) based on both water contact angle and XPS atomic composition data.

EXAMPLE 6

In order to determine that the results obtained were particular to PVOH, poly(L-lysine) (PLL) was also adsorbed to FEP film using conditions reported in the literature. The adsorption of PLL to FEP was attributed to the reduction of interfacial free energy (the displacement of high energy water molecules from the fluoropolymer/water interface) that drives polymer or biopolymer adsorption ("hydrophobic interactions"). Atomic composition and contact angle data for FEP-PLL are also given in Table 1.

Comparing FEP-PLL and FEP-PVOH, the adsorbed amount and the improvement of wettability are much greater for PVOH than PLL. PVOH is a highly crystalline polymer—it is difficult to dissolve it in water. We suspect the low solubility of PVOH and likely more importantly, its strong tendency to crystallize at the FEP/water interface and, as well, the stabilization of the film by inter- and intra-molecular hydrogen bonding give additional driving forces for adsorption.

EXAMPLE 7

In order to determine the effect of temperature on PVOH adsorption, 0.01 M PVOH solutions were made up using PVOH of $M_w$=108,000. FEP films were immersed in these solutions at temperatures of 10°C., 25° C., 50° C., and 70° C. for 24 h. The O/F ratios (15° takeoff angle) of these samples were 0.32, 1.18, 1.21, and 0.62, respectively. The higher adsorbed amount at intermediate temperatures is likely due to the combined effect of hydrophobic interactions and crystallization force, both of which are temperature dependent.

EXAMPLE 8

In order to determine the mechanical integrity of the modified FEP film, an FEP-PVOH ($M_w$=108,000, 0.01 M, 1 h, room temperature) sample was placed on a piece of aluminum foil. A pressure-sensitive adhesive tape (3M no. 810) was pressed onto the film sample and peeled off slowly at an angle of 180° between the film surface and tape.

The adsorbed PVOH must have mechanical integrity and must adhere to the substrate in order for the present invention to be commercially useful. In order to determine the strength of the adsorption of PVOH to the substrate, the locus of failure in the substrate/PVOH/tape was examined. XPS spectra (15° and 75° takeoff angles) of the film substrate and the tape after the peel test were compared to spectra obtained before the joint was formed, as shown in Table 2. After the peel test, the film was very similar in surface

TABLE 2

XPS Atomic Composition Data (15° Takeoff Angle) of FEP-PVOH ($M_w$ = 108,000, 0.01 M, 24 h, room temperature) and the Tape before and after the Peel Tests

|  | % C | % O | % F |
|---|---|---|---|
| FEP-PVOH, before | 54.04 | 24.94 | 21.02 |
| FEP-PVOH, after | 36.67 | 2.54 | 60.79 |
| tape, before | 87.23 | 12.77 | — |
| tape, after (FEP) | 86.42 | 12.80 | 0.77 |
| tape, after (FEP-PVOH) | 79.76 | 12.43 | 7.81 | composition to virgin FEP, indicating that all of the adsorbed functional polymer was transferred to the tape. After peeling from Virgin FEP, the tape composition changed slightly indicating adhesive failure occurred at the FEP/tape interface. Almost 8% fluorine was present on the tape after peeling from FEP-PVOH, which suggests that cohesive failure occurred within the FEP film itself. These results indicate that the mechanical strength of the PVOH layer and the adhesive strength between FEP and PVOH are stronger than the cohesive strength of FEP itself.

EXAMPLE 9

In order to determine the stability of FEP-PVOH over time, an FEP-PVOH ($M_w$=108,000, 0.01 M, 24 h, room temperature) sample was left under ambient conditions for 24 days. As shown in Table 3, the O/F ratio at 15° takeoff angle increased from 1.19 to 15.92, probably due to significant reorganization of PVOH chains by spreading out evenly across the FEP surface over time. If almost the entire film surface is covered with PVOH, the a amount of fluorine observed by XPS is very low, which gives rise to the extremely high O/F ratio. A smooth film morphology should be desirable in most applications. Co-crystallization of water molecules in the PVOH layer can also give rise to high O/F ratios. Aging has no effect on wettability as indicated by negligible change in water contact angles. Booth XPS and contact angle data of the aged sample indicate that PVOH has remained on the sur ace over time and no migration of PVOH to the bulk has occurred.

EXAMPLE 10

In order to determine the effect of crosslinking PVOH on the stability of FEP-PVOH in solvents, the PVOH previously adsorbed to FEP film was crosslinked by immersing the FEP-PVOH ($M_w$=108,000, 0.01 M, 24 h, room temperature) film samples in an aqueous solution of 0.075 M glutaraldehyde and 0.2 M sulfuric acid for 30 min at 40° C. FEP-PVOH ($M_w$=108,000, 0.01 M, 24 h, room temperature) samples were left in water at room temperature for 14 days, in THF solution at room temperature for 24 h, and in water at 70° C. for 24 h. Crosslinked FEP-PVOH ($M_w$, =108,000 0.01 M, 24 h, room temperature) samples were left in water at room temperature for 24 h, in THF solution at room temperature for 24 h, and in water at 70° C. for 24 h.

Table 3 shows the solvent stability of FEP-PVOH before and after PVOH crosslinking. Overall, there was enough PVOH remaining on the FEP films after exposure to solvents that wettability was not significantly reduced. After exposure to water at 70° C. and THF at room temperature, O/F ratios of FEP-PVOH were lower than those of crosslinked FEP-PVOH indicating the improved stability obtained by crosslinking the PVOH.

TABLE 3

Stability Studies of FEP-PVOH Before and After Crosslinking Reactions: O/F ratios (15° Takeoff Angle) and Advancing and Receding Water Contact Angles (°)

| Samples | O/F | $\theta_A/\theta_R$ |
|---|---|---|
| FEP-PVOH (control) | 1.19 | 63/17 |
| Aging of FEP-PVOH for 24 days | 15.92 | 62/18 |
| FEP-PVOH desorption in $H_2O$ at r.t. | 3.31 | 60/13 |
| FEP-PVOH desorption in $H_2O$ at 70° C. | 1.11 | 59/14 |
| FEP-PVOH desorption in THF at r.t. | 0.67 | 62/18 |
| Crosslinked FEP-PVOH (control) | 1.54 | 50/15 |
| Crosslinked FEP-PVOH desorption in $H_2O$ at r.t. | 1.83 | 58/14 |
| Crosslinked FEP-PVOH desorption in $H_2O$ at 70° C. | 2.31 | 58/14 |
| Crosslinked FEP-PVOH desorption in THF at r.t. | 1.30 | 58/14 |

EXAMPLE 11

Another commercially important fluoropolymer is poly (tetrafluoroethylene) (PTFE).

PTFE films were cleaned in 25 mL of concentrated sulfuric acid solution containing 0.5 g of potassium chlorate for 2 h. The film samples were rinsed with purified water and THF, and then dried at reduced pressure. PTFE films were immersed in an aqueous solution of 0.01 M PVOH ($M_w$=108,000) for 24 h at room temperature. Adsorption of PVOH to PTFE was apparent from the decrease of water contact angles from 117°/92° to 42°/14° and the increase of O/F ratios from 0.012 to 2.29.

PET-PVOH

A commercially useful polymeric film is poly(ethylene terephthalate) (PET), which contains ester groups. Accordingly, a series of adsorption experiments of PVOH to PET from aqueous solution have been carried out. The effects of PVOH concentration, ionic strength, adsorption kinetics, molecular weight of PVOH used, system temperature, and crosslinking the adsorbed PVOH on the adsorbed amount and wettability have been examined.

PET films were rinsed with purified water and methanol, extracted in refluxing hexane for 2 h, and then dried at reduced pressure.

EXAMPLE 12

In order to determine the effects of PVOH concentration on adsorption, PET films were immersed in PVOH ($M_w$=108,000) solutions of 0.001 M, 0.005 M, 0.01 M, 0.05 M, and 0.1 M for 24 h at room temperature. As PVOH concentration increased, water contact angles decreased and reached a plateau region at 40°±2°/13°±2° after 0.01 M.

EXAMPLE 13

To study the effect of solution ionic strength on adsorption, NaCl solutions were made up separately from PVOH solutions. The solutions were then combined, to give final concentrations of 0.01 M PVOH ($M_w$=108,000), and 1 M and 2 M NaCl. PET films were immersed in these solutions for 24 h at room temperature. That contact angles of PET-PVOH with salt were not much different than those without salt indicated that the adsorbed PVOH thickness has reached the sampling depth of contact angle. Since only PET substrate contains carbonyl carbon, the more PVOH adsorbs to PET, the more attenuated the carbonyl cart)on signal is. The carbonyl carbon contents at 15° takeoff angle of the samples with 1 M and 2 M NaCl added were 3.2% and 2.4%, respectively, compared to 4.9 when no salt was added. The thickness of the PVOH layer should be controllable by changing the ionic strength of the solution.

EXAMPLE 14

In order to determine the kinetics of the adsorption process, PET films were left in 0.0 t M PVOH ($M_w$=108,000) solution from 15 min to 48 h.

Table 4 shows carbonyl carbon contents obtained from XPS at 15° takeoff angle and water contact angles as a function of adsorption time. As adsorption time increased, both water contact angles and carbonyl carbon intensities decreased and reached plateau regions. In addition to "hydrophobic interactions", crystallization of PVOH, and low solubility of PVOH in water, we suspect hydrogen bonding between PET and PVOH provides additional driving force for adsorption in this system.

TABLE 4

XPS Carbonyl Carbon Content (15° Takeoff Angle) and Advancing and Receding Water Contact Angles (°) of PET-PVOH as a Function of Adsorption Time

| Time (h) | % C=O | $\theta_A/\theta_R$ |
|---|---|---|
| PET Control | 14.7 | 77/55 |
| 0.25 | 5.5 | 54/26 |
| 0.5 | 5.7 | 50/23 |
| 1 | 6.4 | 47/22 |
| 5 | 5.3 | 36/23 |
| 19 | 5.8 | 36/19 |
| 24 | 4.9 | 39/15 |
| 48 | 5.7 | 41/15 |

EXAMPLE 15

In order to determine the effect of molecular weight and temperature on PVOH adsorption, 0.01 M PVOH solutions were prepared using PVOH of $M_w$=25,000, $M_w$=108,000, and $M_w$=133,000. PET films were immersed in these solutions at temperatures of 10° C., 25° C., 50° C., and 70° C. for 24 h. Water contact angles and carbonyl carbon content (15° takeoff angle) of these samples were 40°±2°/13°±2° and 5% ±0.2%, respectively, independent of molecular weight and temperature in the range studied.

EXAMPLE 16

In order to determine the effect of crosslinking PVOH on the stability of PET-PVOH in solvents, the PVOH previously adsorbed to PET film was crosslinked by immersing the PET-PVOH ($M_w$=108,000, 0.01 M, 24 h, room temperature) film samples in an aqueous solution of 0.075 M glutaraldehyde and 0.2 M sulfuric acid for 30 min at 40° C. Uncrosslinked and crosslinked PET-PVOH ($M_w$=108,000, 0.01 M, 24 h, room temperature) samples were left in water at room temperature for 24 h, in THF solution at room temperature for 24 h, and in water at 50° C. for 24 h.

TABLE 5

Stability Studies of PET-PVOH Before and After Crosslinking Reactions: Carbonyl Carbon Contents (15° Takeoff Angle) and Advancing and Receding Water Contact Angles (°)

| Samples | % C=O | $\theta_A/\theta_R$ |
|---|---|---|
| PET (control) | 14.7 | 77/55 |
| PET-PVOH (control) | 4.9 | 39/15 |
| PET-PVOH desorption in $H_2O$ at r.t. | 11.4 | 40/13 |
| PET-PVOH desorption in $H_2O$ at 50° C. | 10.8 | 40/13 |
| PET-PVOH desorption in THF at r.t. | 13.3 | 48/14 |
| Crosslinked PET-PVOH (control) | 4.6 | 58/14 |
| Crosslinked PET-PVOH desorption in $H_2O$ at r.t. | 5.1 | 58/13 |
| Crosslinked PET-PVOH desorption in $H_2O$ at 50° C. | 4.6 | 56/14 |
| Crosslinked PET-PVOH desorption in THF at r.t. | 3.8 | 59/14 |

Table 5 shows solvent stability of PET-PVOH before and after crosslinking of PVOH. Wettability of PET-PVOH decreased somewhat after the crosslinking reaction due to the decrease of the number of free hydroxyl groups and the presence of more hydrophobic glualdehyde molecules. Overall, there was enough PVOH remaining on PET after exposure to solvents that wettability was not significantly reduced. The carbonyl carbon content of the uncrosslinked PET-PVOH samples increased dramatically after solvent exposure due to the desorption of PVOH. Crosslinking stabilized the adsorbed PVOH: no loss of PVOH was observed after exposure to different solvents at various temperatures.

PMP-PVOH

EXAMPLE 17

A polyolefin, poly(4-methyl-1-pentene) (PMP), was also evaluated for PVOH adsorption. PMP films were extracted in refluxing dichloromethane for 1 h and then dried at reduced pressure.

PMP films were immersed in an aqueous solution of 0.01 M PVOH ($M_w$=108,000) for 24 h at room temperature. Adsorption of PVOH to PMP was apparent from the decrease of water contact angles from 115°/89° to 58°/16° and the increase of oxygen content from about 0% to 12.36% at 15° takeoff angle (the only other element present is carbon).

Si—R-PVOH

The adsorption of poly(vinyl alcohol) to silicon wafers containing various covalently bonded functional groups such as silanol, perfluoroalkyl, alkyl, and ester groups occurs as well and is controlled by adsorption time, PVOH concentration, ionic strength, molecular weight of PVOH, and adsorption temperature.

EXAMPLE 18

Silicon wafers were rinsed with purified water and submerged in a freshly prepared solution of 7 parts of concentrated sulfuric acid containing dissolved sodium dichromate (about 3–5 wt %) and 3 parts of 30% hydrogen peroxide overnight. They were then rinsed with purified water and placed in a clean oven at 120° C. for 1–2 h. Immediately after cleaning, silicon wafers are suspended in a flask containing 0.5 mL of chlorosilane such as (tridecafluoro-1,1,2,2-tetrahydrooctyl)dimethylchlorosilane, 10-(carbomethoxy)decyldimethylchlorosilane, or decyldimethylchlorosilane. The vapor phase reactions are carried out at 60–70° C. for 3 days. The modified wafers are rinsed with toluene, ethanol, water, and are dried in a clean oven at 120° C. for 10 min. These solid model surfaces containing a wide range of functional groups, perfluoroalkyl, alkyl, and ester groups. The adsorption behaviors of PVOH on these surfaces were parallel to those on polymeric substrates, FEP/PTFE, PMP, and PET, respectively.

Further Functionalization

Figure 3:
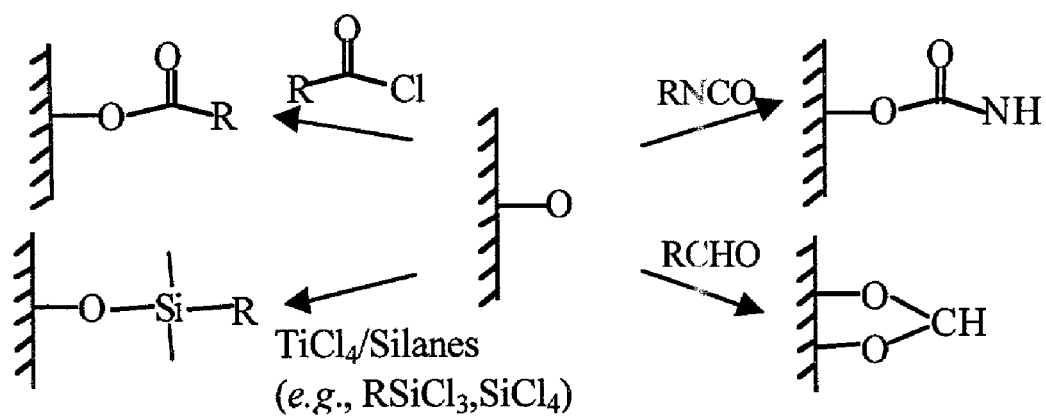
FIG. 3 shows the surface chemistry of —OH group.

The hydroxyl groups on PVOH-adsorbed surfaces may be further converted to other functional groups to impart desirable surface properties. As shown in FIG. 3, using the organic chemistry of hydroxyl groups with reagents such as acid chlorides, isocyanates, aldehydes, silanes (e.g., silicon tetrachloride), and titanium tetrachloride, a wide range of chemical structures can be introduced to different surfaces for desirable properties such as wettability, adhesion, friction, biocompatibility.

EXAMPLE 19

Perfluoropropyl groups were introduced to PET surfaces by reacting about 0.5 mL of heptafluorobutyryl chloride with crosslinked PET-PVOH in the vapor phase overnight. After the reaction, fluorine content increased from 0 to 18.28% at 15° takeoff angle and water contact angles increased from 58°/14° to 94°/36°.

EXAMPLE 20

To demonstrate the feasibility of converting organic polymers to inorganic materials, a vapor phase reaction between crosslinked PET-PVOH and $SiCl_4$ was carried out. A kinetics study indicated that a reaction time of 15 min was sufficient for each cycle. At the end of each cycle, $SiCl_4$ was purged out of the reaction vessel before film samples were exposed to air for 5 min to allow the conversion of Si—Cl to Si—OH. Silicon content rises steadily as the reaction cycle number increases—after the first and tenth cycles, the atomic compositions at 15° takeoff angle are C, 65.04%; O, 31.38%; Si, 3.58% and C, 25.79%; O, 55.13%; Si, 19.08%, respectively. Water contact angles also decrease as a function of number of reaction cycles and reach values similar to those of silicon wafers after the eighth reaction cycle, 23°/8°. The reactivity of these "silica" surfaces with various silanes is similar to that of silicon wafers.

EXAMPLE 21

Another type of inorganic surfaces, $TiO_2$, was prepared by vapor phase reactions between dry crosslinked PET-PVOH and $TiCl_4$. Similar to the reaction with $SiCl_4$, as the number of reaction cycle increases, Ti content increases and water contact angles decease. The reactivity of these surfaces is similar to that of "titania" solids as assessed by reactions with hydridosilanes.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

I claim:

1. A method of modifying the surface of a hydrophobic solid-phase object with an adsorbed layer of PVOH, comprising:
   a) immersing the solid-phase object in a PVOH solution having a concentration of about 0.001 M to about 0.5 M, for at least about 10 min to about 100 hours at a temperature ranging from about 10° C. to about 70° C.;
   b) removing the object from the solution after PVOH is adsorbed to the surface of the object;
   c) rinsing the object with water to remove any loosely attached PVOH; and
   d) drying the object at reduced pressure or ambient conditions wherein there is crystallization of PVOH at the solid solution/interfaces forming an adsorbed layer of PVOH to the object is sufficiently stable that it does not redissolve in an aqueous solution, wherein the solid-phase object has a lower surface energy relative to PVOH, wherein the object consists of covalently attached monolayers on silicon wafers.

* * * * *